Dec. 7, 1965

B. AMIET ET AL 3,222,225

DEFERRED-ACTION BATTERY

Filed Feb. 15, 1961

INVENTORS:
BERNARD AMIET
PIERRE LANGELLA
CHRISTIAN SENTENAC

BY *(signature)*

ATTORNEY

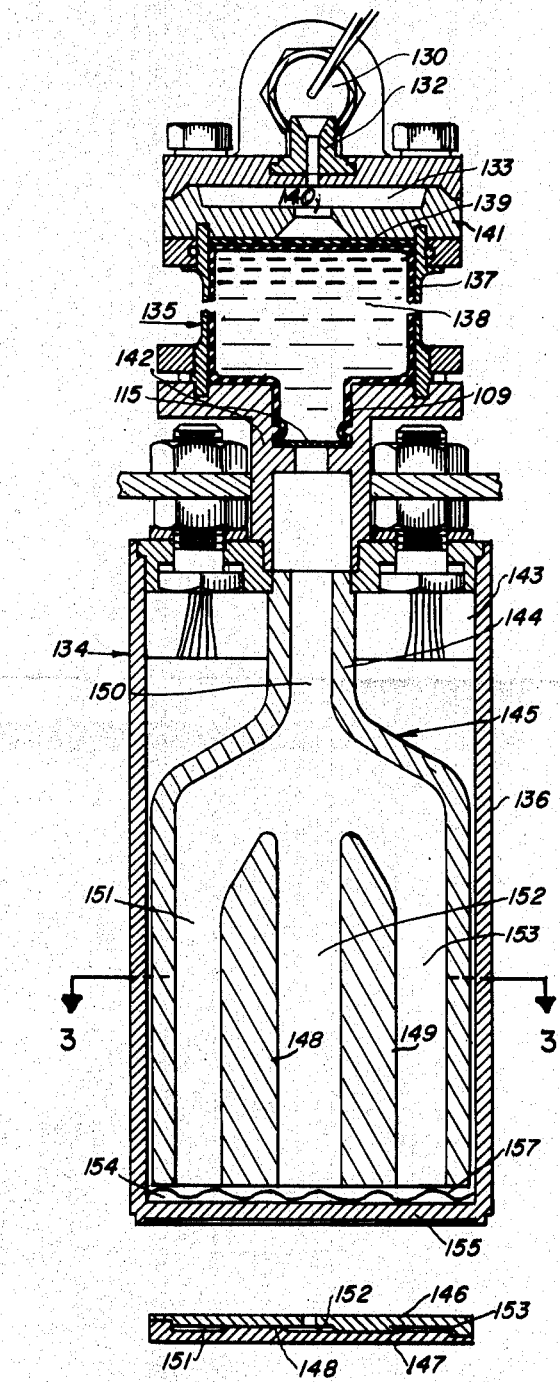

INVENTORS:
BERNARD AMIET
PIERRE LANGELLA
CHRISTIAN SENTENAC
ATTORNEY

United States Patent Office 3,222,225
Patented Dec. 7, 1965

3,222,225
DEFERRED-ACTION BATTERY
Bernard Amiet, Ville-d'Avray, Seine-et-Oise, Pierre Langella, Marly-le-Roi, Seine-et-Oise, and Christian Sentenac, Mantes-la-Ville, Seine-et-Oise, France, assignors to Yardney International Corp., New York, N.Y., a corporation of New York
Filed Feb. 15, 1961, Ser. No. 89,507
Claims priority, application France, Feb. 16, 1960, 818,615, Patent 77,177
2 Claims. (Cl. 136—90)

This invention relates to deferred-action batteries of the type designed to activate battery cells before use by the introduction of electrolyte into the cells containing the electrodes.

In the activation of batteries of the above mentioned type it has been found that the introduction of electrolyte into the electrode chambers from above results in the entrapment of air and other gases leading to the incomplete activation of the batteries. The present invention is directed to the solution of this problem in an economical and practical manner, due regard being given to the space limitations in the battery.

It is accordingly an object of the present invention to provide a deferred-action battery of the type mentioned supra wherein electrolyte is introduced into one end of the electrode chambers, the latter being constructed so that said electrolyte pushes gases ahead of it and out of the electrode chambers.

It is a further object of the present invention to provide a deferred action battery as described above wherein provision is made for the transport of electrolyte from electrolyte reservoir to electrode chamber utilizing a minimum of space for this purpose.

Other and more detailed objects will be apparent from the description and drawings wherein:

FIG. 2 is a partial cross-sectional view of another embodiment of the present invention;

FIG. 3 is a cross-sectional view of a detail of an electrolyte distributing element shown in FIG. 2 taken along line 3–3' of FIG. 2;

Figure 1:
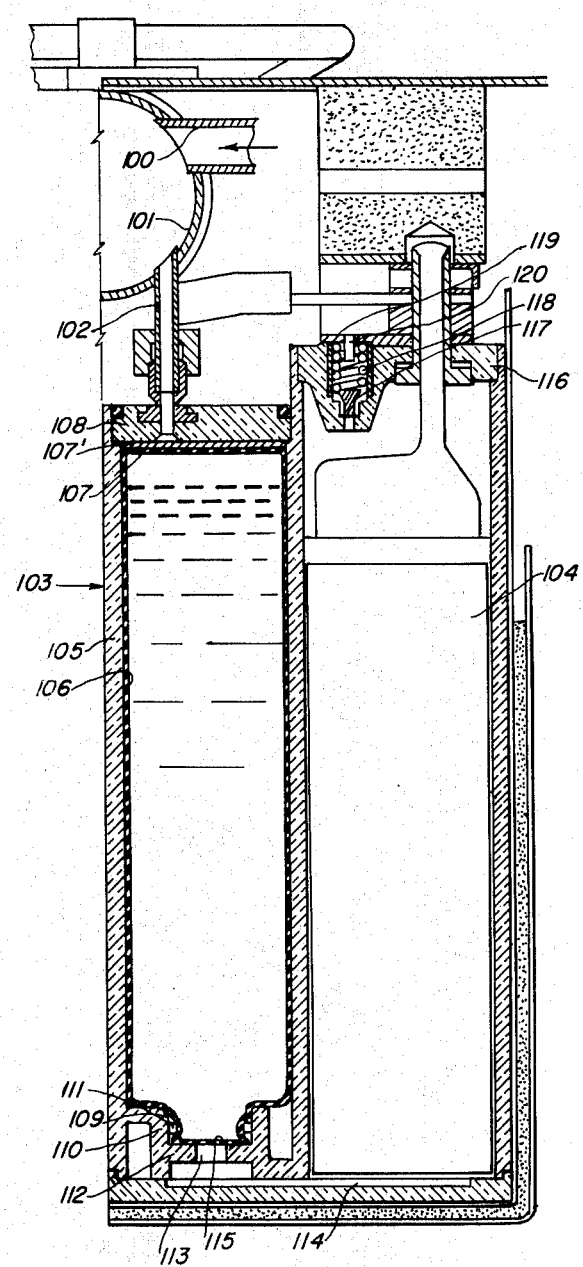
FIG. 1 is a partial cross-sectional view of a battery encompassed by the present invention.

Referring to FIG. 1, 100 is a tubular conduit which serves to conduct gases from a gas generating device (not shown) to a manifold 101 disposed over the entire length of the battery. Manifold 101 is placed outside the electrochemically active area of the battery and along its median plane.

A plurality of tubes 102 each connect manifold 101 with an electrolyte container 103 which is provided for each cell 104.

Electrolyte container 103 comprises a rigid case 105 and an electrolyte bag 106 made of any suitable rupturable soft, flexible material. Top 107 of bag 106 faces cover 108 of case 105. A protective washer 107', made of any suitable material e.g. cardboard, fiberglass, plastic or metal is inserted between said cover 108 and top 107 of bag 106 to prevent the burning of the soft flexible bag by the combustion gases developed to activate the battery.

The base of bag 106 terminates in a neck 109 which fits into recess 110 provided in case 105. Gasket 111 is interposed between neck 109 and bag 106. The lower end of case 105 is provided with an extension 112 having an opening 113 which communicates with cell 104 by means of channel 114. When combustion gases reach manifold 101, a high pressure results and is transmitted through tube 102 to rupture disc 115.

The liquid contained in the bottle 106 is ejected at the bottom thereof by the pressure exerted on the top case 105 by prolonged action of the gases coming from a compressed gas container (not shown). Complete expulsion of the liquid is thus achieved, the liquid being transferred into cell 104 via channel 114, thereby activating the cell.

Activation is achieved very rapidly, completely, with safety and simultaneously for the different cells located on both sides of the manifold 101.

The cell 104 can be hermetically sealed or may be in communication with the atmosphere by means of the conventional intermediary vent. The invention also encompasses, however, valve means for causing communication with the atmosphere, the valve means opening only when the internal pressure exceeds a predetermined level. Such an arrangement prevents excessive pressure build-up within the cell as a result of a decrease in outside pressure. This improvement is particularly applicable to batteries destined to be utilized in air-borne equipment.

In the embodiment shown in FIG. 1, the cover 116 of cell 104 carries a valve 117 which is ordinarily pressed downwardly by spring 118. Spring 118 rests against the cap 119 which is provided with orifice 120. When a pressure is built up in cell 104 which is large enough to overcome the force exerted by spring 118, valve 117 is opened and the gases are vented.

In another aspect of this invention, to insure activation, the battery contains two activators each containing a cartridge and a bottle of compressed gas, both communicating with a common manifold.

In still another variation, the manifold 101 and the tubes 102 are replaced by a one-piece member which is mounted over all covers 108. Such an arrangement prevents losses of pressure and throttling in tubes 102.

In the embodiment of this invention shown on FIGS. 2 and 3, the activating mechanism 130 comprises a percussion cartridge and, optionally, a gas tank (not shown) as well as a fitting 132, connected to a chamber 133. This activates a plurality of cell units 134, each having its own electrolyte container 135, and the cell container 136. The electrolyte container 135 has a bag 137 made of flexible soft material which is filled with electrolyte 138 and whose top is protected by a disc 139. Disc 139 may be made of cardboard, fiber, glass, or metal mesh, etc., and serves to prevent the destructive effect of the hot gases which act on the said bag after entering the opening 140 of cover 141.

The breakable diaphragm 115 which closes the neck 109, rests on a shoulder 142 which has an opening leading to the compartment 143 of cell 136 directly above the neck 144 of a distributor 145. The distributor consists of two identical juxtaposed plates 146 and 147 (FIG. 3) provided respectively with ribs 148 and 149, which form a channel 150. Channel 150 divides into branches 151, 152, and 153. It is by these branches that the electrolyte which comes from the bag 137 penetrates into space 154 provided between the distributor 145 and the base 155 of the compartment 143 containing the cell. Space 154 contains a corrugated base or grid 157 or, optionally, filter paper, through whose interstices the electrolyte flows to all portions of the cell. By this arrangement good irrigation is achieved in the two halves of the cell on both sides of distributor 145.

In the embodiment of this invention shown in FIG. 4, the electrolyte bag, instead of being below or above the electrode compartment as shown in the embodiment described supra, are disposed laterally with respect to each other. In this embodiment of the invention the battery is cylindrically shaped and the electrode compartments and electrolyte reservoirs are arranged as two concentric compartments lying adjacent each other. Activation of this battery may be achieved solely through the use of an explosive charge or through the simultaneous action of an explosive charge and compressed gas. The triggering charge may be a powdered fuel adapted to develop progressive combustion e.g. powdered fuels used in the propulsion of guided missiles and rockets.

Figure 4:
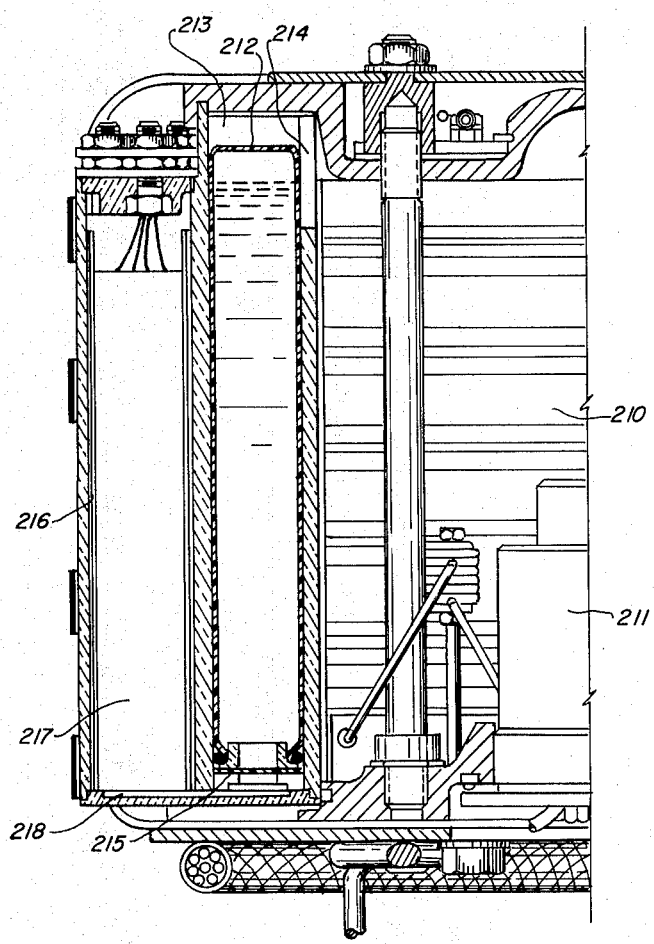
FIG. 4 is partial axial cross-sectional view of a cylindrically shaped battery embodying the present invention, only half of the section being shown, the other half being a mirror image thereof.
Figure 5:
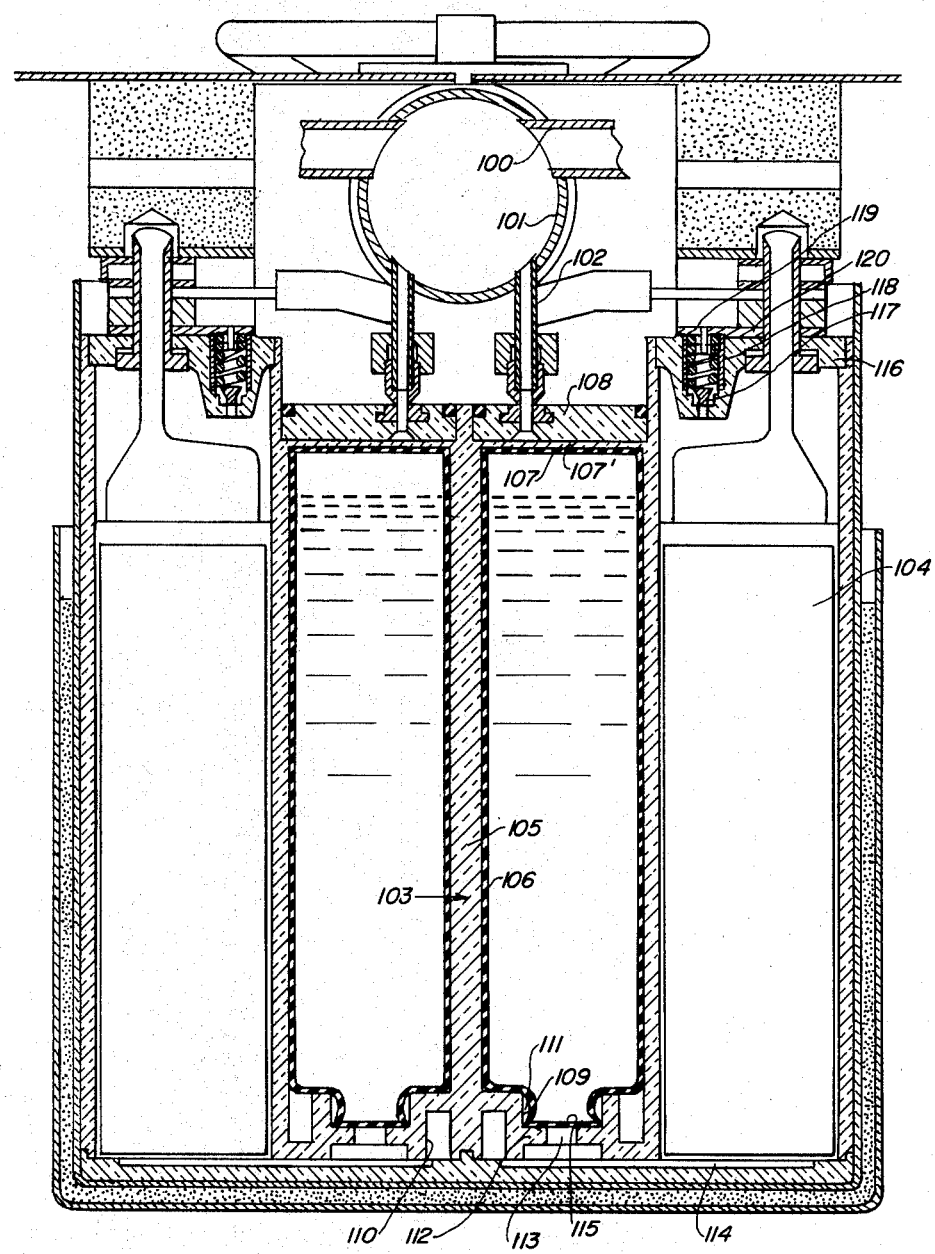
FIG. 5 is a view similar to FIG. 1, showing the entire battery in cross-section.

Referring to FIG. 4, the central part 210 of the battery is occupied by powdered charge 211, the power utilized being, advantageously, a powder or a paste used for the propulsion of guided missiles or rockets. The bottle 212 containing the electrolyte and made of soft flexible material, is housed in an annular compartment 213 which is in communication with the central space 210 by a slot 214. Under the effect of the compression to which the bottle 212 is subjected as a result of the pressure developing in the chamber 210 at the time of the combustion of the powder, the obturating membrane 215 is broken. The electrolyte then penetrates into compartment 216 containing the electrodes 217 by means of a passage 218 provided at the base of compartments 213 and 216.

Numerous other advantages of the invention will be readily apparent to those skilled in the art. Numerous modifications and embodiments can be made without parting from the spirit and scope of the invention and it is to be understood that the same is not to be limited except as set forth in the appended claims.

What is claimed is:

1. A deferred-action battery comprising, in combination:
    a battery casing containing an array of generally upright individual electrochemical cells in spaced relationship within said casing;
    a plurality of generally upright flexible electrolyte-storage vessels individual to said cells and having closed upper ends provided with flexible walls deformable under externally applied pressure, each of said vessels being disposed laterally adjacent a respective one of said cells and communicating with a respective one of said cells at the bottom thereof;
    individual conduit means formed in said casing at the bottom of said cells and said vessels for interconnecting each of said vessels with the respective cell;
    respective rupturable diaphragm means interposed between each of said vessels and the respective cell for normally blocking passage of electrolyte from said vessels into said cells;
    a plurality of compartments formed in said casing each adjacent a respective one of said cells and enclosing a respective one of said vessels for supporting same;
    common pressure means for concurrently applying pressure to said compartments effectively acting upon said vessels at said upper ends to deform downwardly said walls of all of said vessels substantially concurrently for rupturing said diaphragm means and driving electrolyte from said vessels into the respective cells, said pressure means including a source of a pressurizing fluid; and
    manifold means chargeable with said fluid by said source and formed with individual passages communicating with said compartments for pressurizing said vessels exteriorly, each of said cells being provided with an individual valve communicating with the exterior and responsive to a pressure differential between ambient pressure and the pressure within the cell for venting the latter upon attainment of said pressure differential therein.

2. A deferred-action battery comprising, in combination:
    a battery casing containing an array of generally upright individual electrochemical cells in spaced relationship within said casing;
    a plurality of generally upright flexible electrolyte-storage vessels individual to said cells having closed upper ends provided with flexible walls deformable under externally applied pressure, each of said vessels being disposed laterally adjacent a respective one of said cells;
    individual conduit means formed in said casing at the bottom of said cells and said vessels for interconnecting each of said vessels with the respective cell;
    respective rupturable diaphragm means interposed between each of said vessels and the respective cell for normally blocking passage of electrolyte from said vessels into said cells;
    a plurality of compartments formed in said casing each adjacent a respective one of said cells and enclosing a respective one of said vessels for supporting same;
    common pressure means effectively acting upon said vessels at said upper ends to deform downwardly said walls of all of said vessels substantially concurrently for rupturing said diaphragm means and driving electrolyte from said vessels into the respective cells, said pressure means including a source of pressurized combustion gases;
    manifold means chargeable with said gases by said source and formed with individual passages communicating with said compartments for pressurizing said vessels at upper ends of each compartment; and
    shield means interposed between each of said vessels and said manifold means for preventing thermal deterioration of said wall portions, each of said cells being provided with an individual valve communicating with the exterior and responsive to a pressure differential between ambient pressure and the pressure within the cell for venting the latter upon attainment of said pressure differential therein.

References Cited by the Examiner

UNITED STATES PATENTS

| 1,765,027 | 6/1930 | Mitchell | 136—178 |
| 2,810,776 | 10/1957 | Brill et al. | 136—90 |
| 2,899,481 | 8/1959 | Kardorff | 136—162 |
| 2,963,533 | 12/1960 | Gold et al. | 136—90 |
| 3,022,364 | 2/1962 | Chubb et al. | 136—90 |

FOREIGN PATENTS

| 1,022,652 | 1/1958 | Germany. |
| 167,615 | 8/1921 | Great Britain. |

ALLEN B. CURTIS, *Primary Examiner.*

JOHN R. SPECK, JOSEPH REBOLD, MURRAY TILLMAN, *Examiners.*

JOHN H. MACK, H. FEELEY, B. J. OHLENDORF,
*Assistant Examiners.*